(12) United States Patent
Numata

(10) Patent No.: US 9,372,843 B2
(45) Date of Patent: Jun. 21, 2016

(54) DOCUMENT ASSOCIATION DEVICE, DOCUMENT ASSOCIATION METHOD, AND NON-TRANSITORY COMPUTER READABLE MEDIUM

(71) Applicant: FUJI XEROX Co., Ltd., Minato-ku, Tokyo (JP)

(72) Inventor: Kenichi Numata, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 482 days.

(21) Appl. No.: 13/773,147

(22) Filed: Feb. 21, 2013

(65) Prior Publication Data
US 2014/0019852 A1 Jan. 16, 2014

(30) Foreign Application Priority Data
Jul. 12, 2012 (JP) .................................. 2012-156144

(51) Int. Cl.
| | | |
|---|---|---|
| G09G 5/00 | (2006.01) | |
| G06T 15/00 | (2011.01) | |
| G06F 17/24 | (2006.01) | |
| G06F 17/22 | (2006.01) | |

(52) U.S. Cl.
CPC ............ *G06F 17/24* (2013.01); *G06F 17/2235* (2013.01)

(58) Field of Classification Search
CPC .............. G06F 17/2247; G06F 17/212; G06F 17/30905; G06F 17/24; G06F 17/30893
USPC .................. 715/255, 243, 234, 273
See application file for complete search history.

(56) References Cited

U.S. PATENT DOCUMENTS

| | | | | |
|---|---|---|---|---|
| 7,058,695 | B2* | 6/2006 | Takagi | G06F 17/30905 707/E17.121 |
| 2007/0174275 | A1* | 7/2007 | Kan et al. | 707/5 |
| 2008/0126305 | A1* | 5/2008 | Sayeler | G06F 17/30011 |
| 2012/0146996 | A1* | 6/2012 | Kamiyama et al. | 345/419 |
| 2012/0150836 | A1* | 6/2012 | He | G06F 17/30864 707/708 |

FOREIGN PATENT DOCUMENTS

| | | |
|---|---|---|
| JP | 2002-207726 A | 7/2002 |
| JP | 2006-293936 A | 10/2006 |
| JP | 2008176718 A | 7/2008 |

OTHER PUBLICATIONS

Communication dated Jan. 5, 2016 from the Japanese Patent Office in counterpart application No. 2012-156144.

* cited by examiner

*Primary Examiner* — Scott Baderman
*Assistant Examiner* — Hassan Mrabi
(74) *Attorney, Agent, or Firm* — Sughrue Mion, PLLC

(57) ABSTRACT

A document association device includes a document memory, a reference operation receiving unit, an editing operation receiving unit, an operation memory, and an association unit. The document memory stores one or more electronic documents each including plural elements. The reference operation receiving unit receives a reference operation for one or more elements in an electronic document stored in the document memory. The editing operation receiving unit receives an editing operation for one or more elements in an electronic document stored in the document memory. The operation memory stores information on a received operation. When the editing operation receiving unit receives an editing operation after the reference operation receiving unit receives a reference operation, the association unit associates one or more elements targeted by the reference operation with one or more elements targeted by the editing operation, in accordance with information stored in the operation memory.

12 Claims, 15 Drawing Sheets

FIG. 2

```
<?xml version="1.0" encoding="utf-8" standalone="no"?>
<BOOK id="X40449630-037E-941D-D13F-CF02C0901E64">
<H1 id="X753E0B3B-DA76-7676-2483-EC8706032993">
    <TITLE id="X5332838C-B358-9F9B-4FE1-EC87573l7198">
        <PARA id="X9402DB1D-F268-370F-4619-EC87AB479D6C">Structured Document Creation Support Module: Sample Document </PARA>
    </TITLE>
    <DOCITEM id="X231DFCAF-6E5E-1AEE-CA68-EC880D11E36A">
        <PARA id="XB30DDEAB-33FA-4E9B-899C-8AB452BDBA98">This material is a sample document of Abcdefghijklmn Manual Weaver (Manual weaver). </PARA>
        <PARA id="X92C1593E-CBFA-4B09-8AAE-047D12A5339F">Use this sample document to check the functions of the Manual Weaver Structured Document Creation Support Module. </PARA>
        <NOTICE id="X25732C5B-145F-2D1D-E732-EC8856FD062C"LEVEL="1">
            <PARA id="X6DDDE5A2-FAF5-066F-370D-EC88DAA1F221">This material is a sample document for the Structured Document Creation Support Module but is not the manual. </PARA>
        </NOTICE>
        <NOTICE LEVEL="1" id="X2DA133AA-FDB9-442A-A427-264D8B101A5E">
            <PARA id="X0B5D8104-204C-4340-BB50-0D04287F9D0C"> For how to operate the Structured Document Creation Support Module, see the operating manual. </PARA>
        </NOTICE>
    </DOCITEM>
</H1>
    . . .   . . .   . . .
    . . .   . . .   . . .
</BOOK>
```

| REFERENCE OPERATION | RELEVANCE SCORE |
|---|---|
| SCROLL | 1 |
| HIGHLIGHT | 2 |
| COPY | 4 |
| SET CURSOR | 2 |
| . . . | . . . |

FIG. 13

| EDITING OPERATION | RELEVANCE SCORE |
|---|---|
| INPUT TEXT | 1 |
| ADD ELEMENT | 3 |
| PASTE | 2 |
| DELETE ELEMENT | 0 |
| . . . | . . . |

FIG. 14

| REFERENCE SOURCE ELEMENT ID | REFERENCE OPERATION (SCORE) | EDIT DESTINATION ELEMENT ID | EDITING OPERATION (SCORE) |
|---|---|---|---|
| X001 | SCROLL (1) | Y001 | INPUT TEXT (1) |
| X002 | HIGHLIGHT (2) | Y002 | ADD ELEMENT (3) |
| X003 | COPY (4) | Y003 | PASTE (2) |
| X004 | SET CURSOR (2) | Y004 | INPUT TEXT (1) |
| . . . | . . . | | . . . |

FIG. 16

| ELEMENT ID | REFERENCE FREQUENCY |
|---|---|
| X001 | 1 |
| X002 | 1 |
| X003 | 10 |
| X004 | 3 |
| ... | ... |

FIG. 17

| REFERENCE SOURCE ELEMENT ID | REFERENCE OPERATION | EDIT DESTINATION ELEMENT ID | EDITING OPERATION | OPERATOR ID |
|---|---|---|---|---|
| X001 | SCROLL | Y001 | INPUT TEXT | P01 |
| X002 | HIGHLIGHT | Y002 | ADD ELEMENT | P02 |
| X003 | COPY | Y003 | PASTE | P02 |
| X004 | SET CURSOR | Y004 | INPUT TEXT | P02 |
| ... | ... | ... | ... | ... |

DOCUMENT ASSOCIATION DEVICE, DOCUMENT ASSOCIATION METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2012-156144 filed Jul. 12, 2012.

BACKGROUND

Technical Field

The present invention relates to a document association device, a document association method, and a non-transitory computer readable medium.

SUMMARY

According to an aspect of the invention, there is provided a document association device including a document memory, a reference operation receiving unit, an editing operation receiving unit, an operation memory, and an association unit. The document memory stores one or more electronic documents each including plural elements. The reference operation receiving unit displays on a screen a first group of elements included in an electronic document stored in the document memory, and receives a reference operation which is targeted at one or more elements in the first group of elements. The editing operation receiving unit displays on the screen a second group of elements included in an electronic document stored in the document memory, and receives an editing operation which is targeted at one or more elements in the second group of elements. The operation memory stores information indicating that an operation has been received. When the editing operation receiving unit receives an editing operation which is targeted at one or more elements in the second group of elements after the reference operation receiving unit receives a reference operation which is targeted at one or more elements in the first group of elements, the association unit associates the one or more elements targeted by the reference operation in the first group of elements with the one or more elements targeted by the editing operation in the second group of elements, in accordance with information stored in the operation memory indicating that the editing operation has been received and information stored in the operation memory indicating that the reference operation has been received.

BRIEF DESCRIPTION OF THE DRAWINGS

An exemplary embodiment of the present invention will be described in detail based on the following figures, wherein:

FIG. 2 illustrates an example of an XML document;

FIG. 12 illustrates an example of relevance scores for individual types of reference operations;

FIG. 13 illustrates an example of relevance scores for individual types of editing operations;

FIG. 14 illustrates an example of data contained in an association DB;

FIG. 16 illustrates an example of information on reference frequencies for individual elements; and FIG. 17 illustrates an example of data contained in the association DB, which includes IDs of users (or operators) who have performed operations involving association.

DETAILED DESCRIPTION

Figure 1:
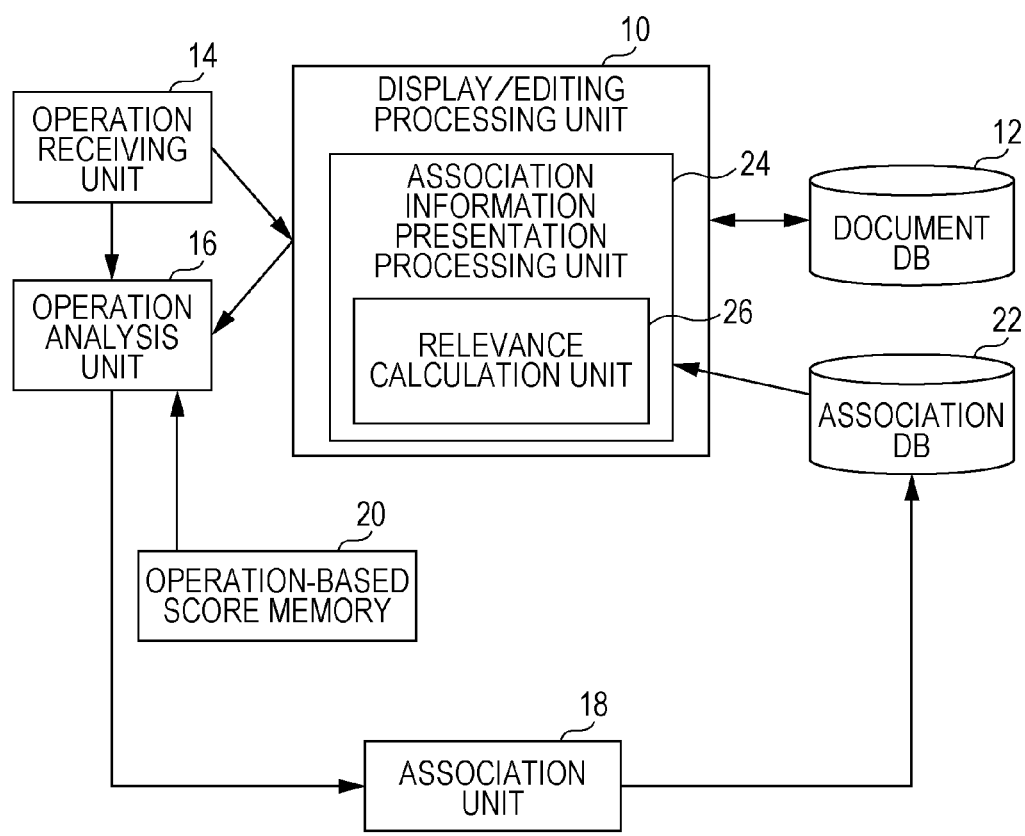
FIG. 1 illustrates an example of a document editing system according to an exemplary embodiment.

A system according to an exemplary embodiment is configured to, when editing an electronic document (document data) including one or more elements by referring to another electronic document, record association between electronic documents or between elements in terms of reference or non-reference during editing and present the association to users.

One typical example of this type of electronic document is a structured document. A structured document is a document having plural elements in a hierarchical structure. Various languages for describing structured documents, such as Standard Generalized Markup Language (SGML), Hypertext Markup Language (HTML), and Extensible Markup Language (XML), are available and are widely utilized.

In this exemplary embodiment, each of plural electronic documents is assigned unique identification information (referred to as a "document ID"), and each of elements in the individual electronic documents is also assigned unique identification information (referred to as an "element ID"). For example, some of the existing XML editors have a function for assigning unique identification information to a created element, and each element may be assigned an element ID using a similar function.

Element IDs may be unique in an electronic document including elements, or may be unique in a set of electronic documents to which the system according to this exemplary embodiment is applicable. An element ID, which is unique in an electronic document, may be combined with a document ID of an electronic document including the element identified by the element ID to make the element ID unique in a set of electronic documents.

In this exemplary embodiment, in an exemplary situation, when opening and editing an electronic document using a document editing application on a personal computer or the like, the user also opens another document to refer to it (for reference). If the document used for reference is long, it may not be possible to display the entirety of the document in a display window for the document. The user may search for the part to be referred to in the document through scrolling, typing in search terms, or any other suitable operation, and edit the electronic document to be edited while viewing the part or by, for example, copying and pasting the part to the electronic document. That is, the user finds a certain part to be referred to in an electronic document used for reference and edits the document to be edited (by utilizing the found part). This operation flow may be natural to users.

In this exemplary embodiment, when performing an operation of referring to a certain part in a reference document (hereinafter referred to as a "reference operation") and performing an operation of editing a certain part in a document to be edited (hereinafter referred to as an "editing operation") immediately after the reference operation in accordance with the operation flow described above, the user associates the part which has been referred to and the edited part with each other. In other words, when an editing operation is performed, a reference operation carried out immediately before the editing operation is specified, and the part edited in the editing operation is associated with the part referred to in the reference operation. Association between desired parts is established in units of "elements" each of which is assigned an element ID.

The term "editing operation immediately after the reference operation" (or "reference operation immediately before the editing operation"), as used herein, means that no other reference operation or editing operation, except an operation for specifying a position or range of the target of the editing operation, is performed between the reference operation and the editing operation (for example, "Set cursor"). In other words, a non-editing or non-reference operation carried out between the editing operation and the reference operation, such as moving a display window for the document or an operation for other applications, would be ignored. Further, while an operation for specifying a position or range in a document, such as "Set cursor", is one type of reference operation in a specific example described below, an operation for specifying a position or range of the target of the editing operation is not regarded as a reference operation immediately before the editing operation. That is, when an editing operation is performed, if the operation performed immediately before the editing operation is an operation of specifying the position or range of the target of the editing operation in an electronic document, the operation performed immediately before the editing operation is not regarded as a reference operation immediately before the editing operation and is ignored.

FIG. 1 illustrates an example functional configuration of a document editing system according to this exemplary embodiment. The illustrated system is typically implemented as software on a computer such as a personal computer.

A document database (DB) 12 has registered (or stored) therein one or more electronic documents in the form of, for example, files. In the illustrated example, electronic documents registered in the document DB 12 are XML documents, and each of elements in the individual XML documents is assigned an element ID.

A display/editing processing unit 10 is a function module that displays and edits an electronic document. The displaying and editing function implemented by the display/editing processing unit 10 may be similar to that of a general structured document editor, except the function of an association information presentation processing unit 24 described below. The display/editing processing unit 10 has a function for opening multiple electronic documents on a screen to edit or refer to an electronic document, and a function for assigning an element ID to an element that is added to an electronic document.

An operation receiving unit 14 is a function module that receives user operations to refer to an electronic document and edit an electronic document by using the display/editing processing unit 10. The operations received by the operation receiving unit 14 may include operations relating to an editing operation and operations relating to a reference operation. The editing operation is an operation to alter the content of an electronic document. Examples of operations relating to the editing operation include "Input text", "Add element", "Delete element", and "Paste". The reference operation is an operation which is performed by the user to refer to an electronic document and which does not involve the alteration of the content of the document. Examples of operations relating to the reference operation include "Scroll", "Highlight", "Copy", and "Set cursor". The display/editing processing unit 10 executes processing, such as scrolling an electronic document displayed in a display window, copying a selected portion, adding input text to an electronic document, or pasting a copied portion to a specified paste destination, in accordance with an operation received by the operation receiving unit 14. The operation receiving unit 14 at least temporarily stores information on the received operation for association described below. To that end, for example, the operation receiving unit 14 may include a memory that stores information on an operation as a history record.

An operation analysis unit 16 specifies the types of reference and editing operations received by the operation receiving unit 14, or specifies elements in electronic documents targeted by the reference operation and the editing operation (the details of which will be described below).

If it is determined, as a result of the analysis of the operation analysis unit 16, that an editing operation has been performed immediately after a reference operation was performed, an association unit 18 associates the element targeted by the reference operation with the element targeted by the editing operation, by registering the pair of elements (namely, the pair of element IDs of the elements) in an association DB 22 (the details of which will be described below).

The association information presentation processing unit 24 included in the display/editing processing unit 10 refers to the association DB 22 to present, in association with an element of an electronic document displayed in a window, information on an element in an electronic document at the reference destination which is associated with the element (the details of which will be described below).

The association information presentation processing unit 24 may have a function for, if there are multiple elements associated with a displayed element, giving priority to the multiple elements in accordance with the levels of association and presenting the multiple elements. In the example illustrated in FIG. 1, this function is implemented by an operation-based score memory 20 and a relevance calculation unit 26.

The operation-based score memory 20 stores, for each type of operation relating to the reference operation and the editing operation, a relevance score corresponding to the operation. The relevance score is a basic point indicating how strong the association is between elements associated through a reference operation and an editing operation.

The relevance calculation unit 26 calculates a relevance that is an index indicating how strong the association is between elements on the basis of relevance scores for operations that lead to the association between the elements. In this exemplary embodiment, association between elements is based on the detection of a pair of operations including a reference operation and an editing operation which follows the reference operation. Thus, the relevance between an element targeted by the reference operation and an element targeted by the editing operation is calculated using a pair of relevance scores for the reference operation and the editing operation by, for example, multiplying the relevance scores. The relevance calculation unit 26 determines relevances between a given element and individual relevant elements associated with the given element, and the association information presentation processing unit 24 gives priority to the relevant elements in accordance with the relevances and presents the relevant elements in order from, for example, the highest relevance.

The document editing system according to this exemplary embodiment has been briefly described. The individual units of the system will now be described in detail.

Figure 3:
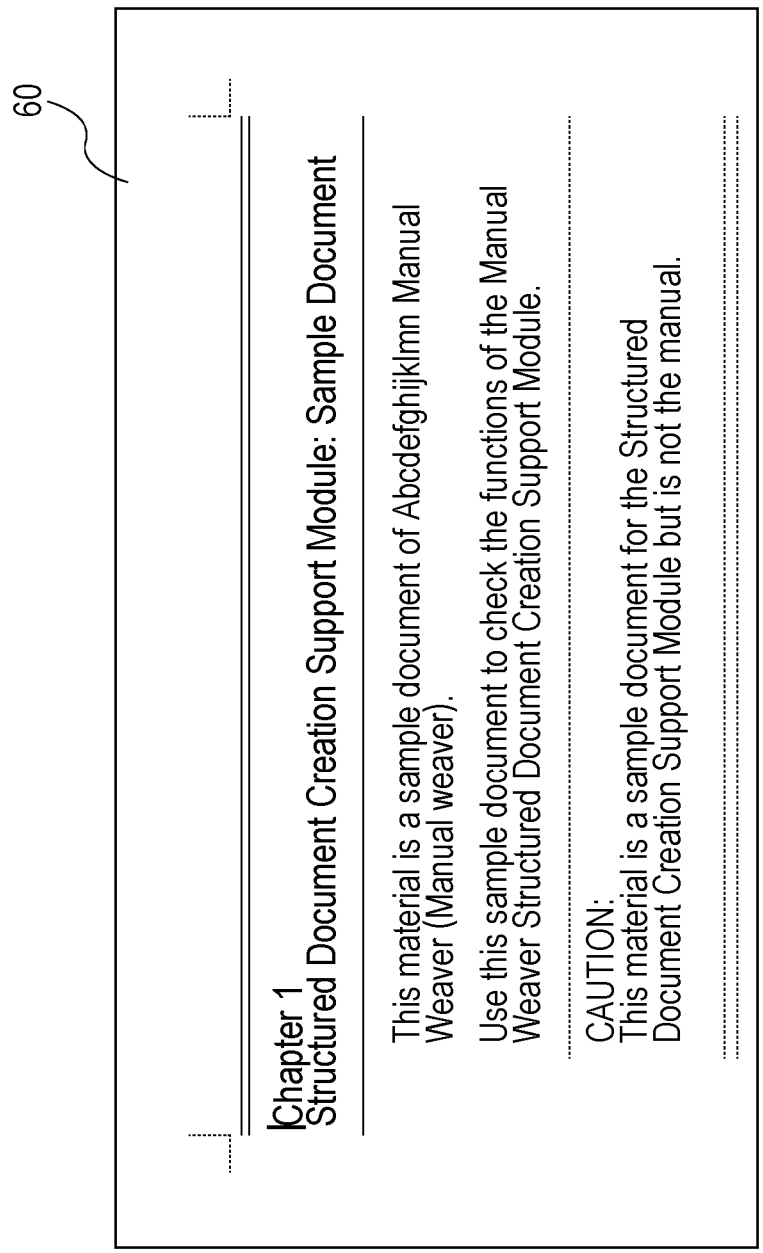
FIG. 3 illustrates an example display of the document illustrated in FIG. 2.
Figure 4:
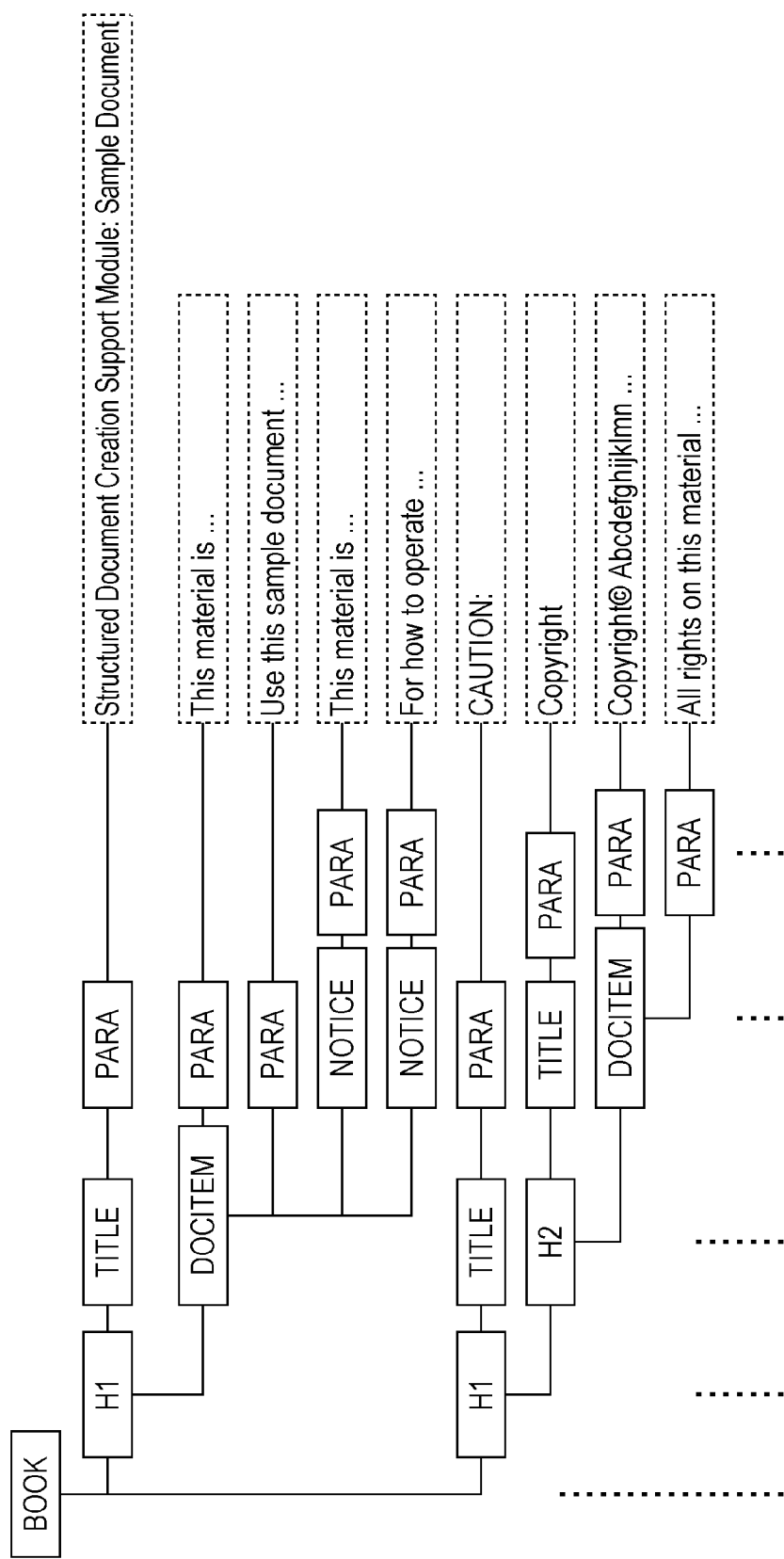
FIG. 4 illustrates a hierarchical structure of elements in the document illustrated in FIG. 2.

FIG. 2 illustrates an example of an electronic document 50 registered in the document DB 12. The electronic document 50 illustrated in FIG. 2 is an example of an XML document. The parameter id="xxxxxxxx" included in the start tag of each element of the document 50 represents the element ID of the element. When the XML document 50 is displayed using the document editing system (by, for example, applying a style sheet to the XML document 50), for example, a displayed document 60 illustrated in FIG. 3 is obtained. In the display example illustrated in FIG. 3, a portion of the XML document 50 which is displayed in a display window is illustrated. FIG. 4 illustrates a hierarchical (tree) structure of elements included in the XML document 50 illustrated in FIG. 2.

Figure 5:
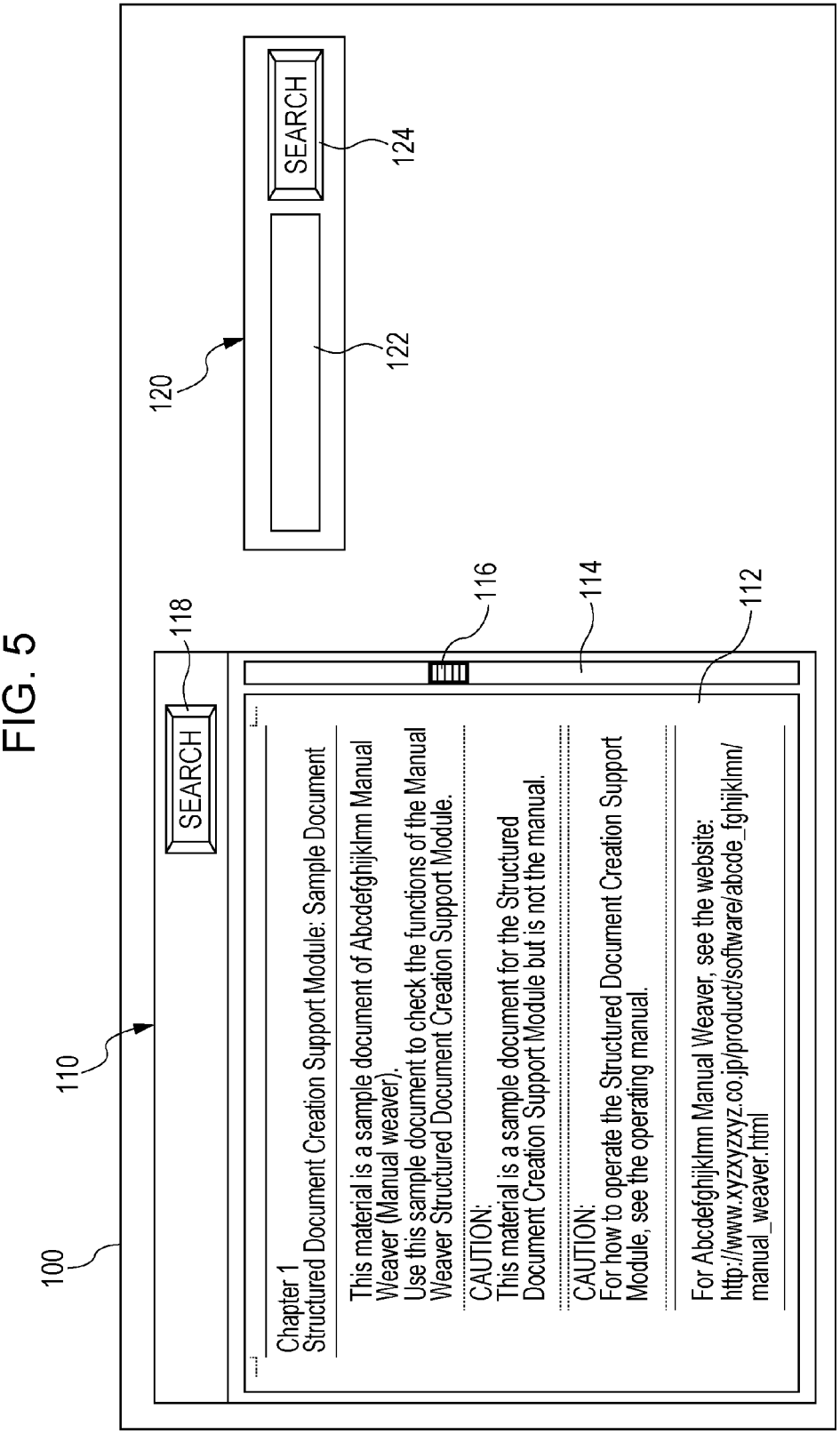
FIG. 5 illustrates an example of a document display screen generated by a display/editing processing unit.

FIG. 5 illustrates an example of an electronic document displayed by the display/editing processing unit 10. In the illustrated example, a display window 110 appears on a screen 100, and has a document display area 112. A portion of the electronic document that is large enough to be displayed in the document display area 112 is displayed in the document display area 112. A scroll bar 114 is located near the document display area 112, and a slider 116 is provided on the scroll bar 114. A user operates a pointing device or the like to move up and down the slider 116 to move, or scroll, the portion to be displayed in the document display area 112. In the illustrated example, the display window 110 further has a search button 118. The user presses the search button 118 using the pointing device or the like to open a search window 120. The user enters a search term (for example, a Boolean expression with one or more keywords) in a search term input field 122 in the search window 120, and presses a search execution button 124. Then, a search is made to the electronic document being displayed in the display window 110, and a portion including text in the document that matches the search term is displayed in the document display area 112. In this displayed document, results matching the search term are highlighted in bold, by background color, or the like.

Next, an example of a processing procedure for associating elements with each other, which is performed by the operation analysis unit 16 and the association unit 18, will be described with reference to FIGS. 6 and 7.

Figure 6:
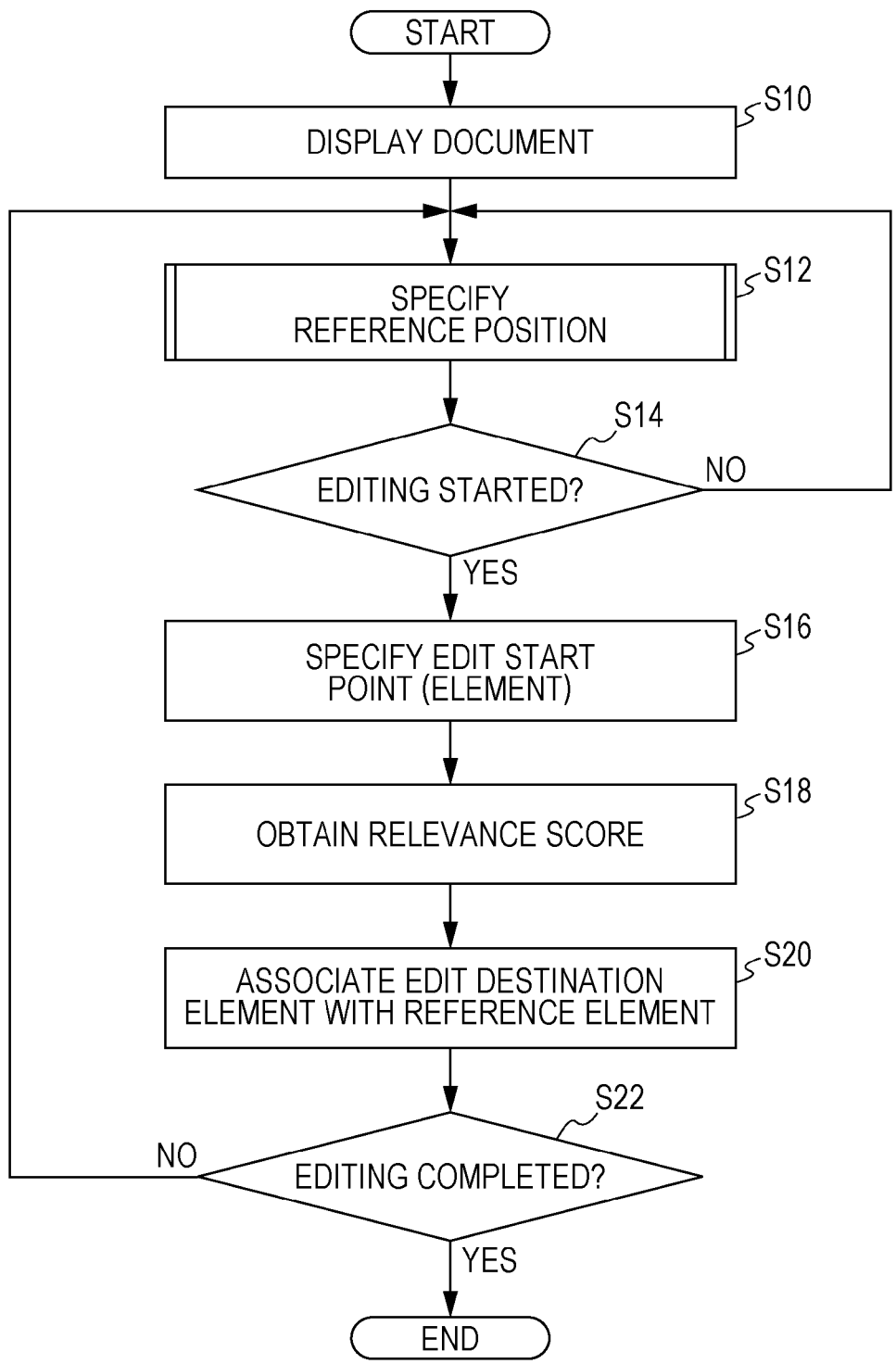
FIG. 6 is a flowchart illustrating an example of a procedure for associating elements with each other, which is performed by the system according to the exemplary embodiment.

FIG. 6 illustrates an overall process of the processing procedure. The display/editing processing unit 10 opens files of multiple electronic documents, and displays on a screen, for each electronic document, a display window where a (for example, partially) displayed image of the electronic document is displayed (S10). All the multiple electronic documents may be opened so as to be editable or some of them may be opened so as not to be editable (or in such a manner that only reference operations are allowed). The operation analysis unit 16 monitors a user operation received by the operation receiving unit 14, detects that an operation relating to the reference operation is performed on any of the opened electronic documents, and specifies the position of the target of the operation (that is, which element in which electronic document the operation) (S12).

Figure 7:
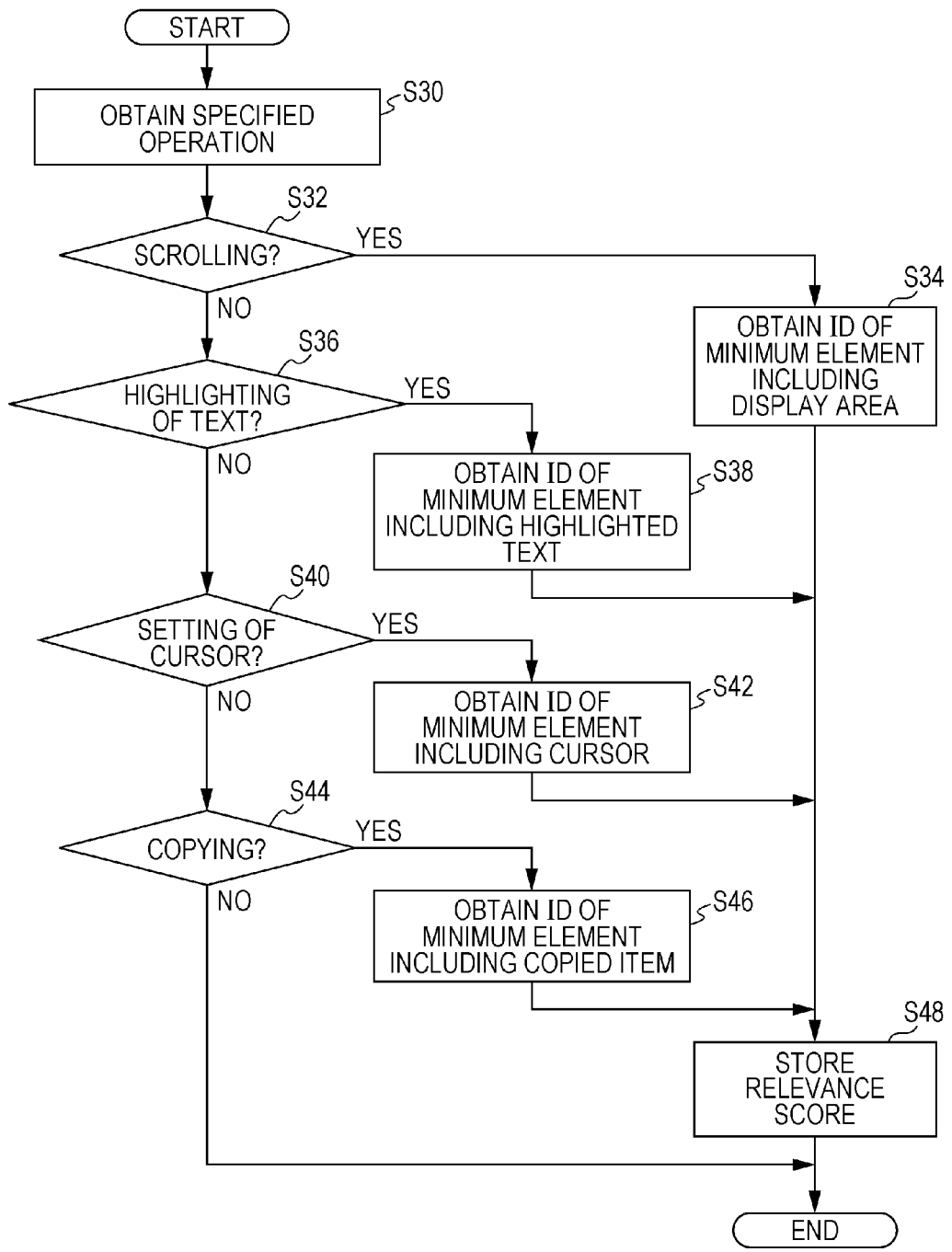
FIG. 7 is a flowchart illustrating an example of a detailed procedure of a reference position specifying process in the flowchart illustrated in FIG. 6.

FIG. 7 illustrates a procedure of an example of the detailed procedure of the reference position specifying process (S12). The operation analysis unit 16 executes the procedure illustrated in FIG. 7 each time the operation receiving unit 14 receives a user operation. In the illustrated procedure, first, the operation analysis unit 16 obtains information on the received user operation from the operation receiving unit 14. The obtained information on the user operation may include information indicating the type of operation (such as scrolling, highlighting, or copying), information (for example, document ID) identifying an electronic document targeted by the operation, and information indicating the position or range of the target of the operation in the electronic document targeted by the operation. The information described above may be determined using any technology now known or later developed, on the basis of information obtained through a graphical user interface (GUI) provided by the operating system or the like.

The operation analysis unit 16 performs determination of S32, S36, S40, and S44 based on the obtained information.

Figure 8:
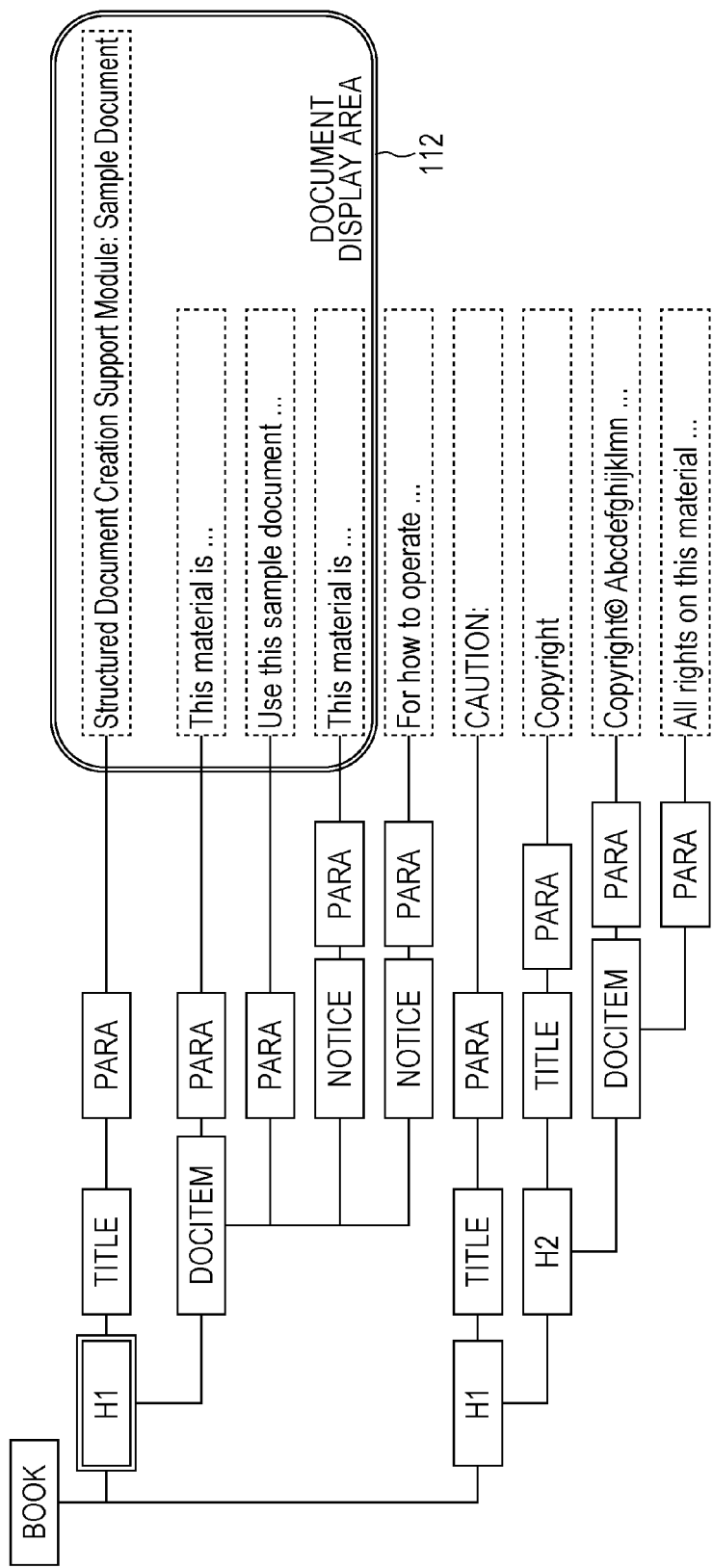
FIG. 8 illustrates a minimum element including elements displayed in a display window at a certain time point.

In the illustrated example, first, in S32, it is determined whether or not the received operation is a scrolling operation on the electronic document targeted by the operation and displayed in the window. If it is determined that the received operation is a scrolling operation, a minimum element including the portion of the electronic document being displayed in the document display area 112 of the window at the time of the completion of the scroll in accordance with the operation is specified, and the element ID of the minimum element is obtained (S34). Since the display/editing processing unit 10 is configured to manage which portion of which electronic document is being displayed in the document display area 112 of each opened display window, the operation analysis unit 16 may obtain information identifying the displayed portion from the display/editing processing unit 10. The operation analysis unit 16 specifies which element is included in the portion of the electronic document being displayed in the document display area 112 in accordance with the obtained information. For example, as illustrated in FIG. 8, four paragraph ("PARA") elements in the tree (hierarchical) structure of the elements illustrated in FIG. 4 are displayed in the document display area 112 when the scroll stops. In this case, in S34, the operation analysis unit 16 specifies a (single) minimum element including all the four "PARA" elements. In the illustrated example, the initial "H1" element (in FIG. 8, highlighted with a double line frame) in the electronic document is the "(single) minimum element". In the specifying process, for example, a tree structure composed of elements of an electronic document is traced back to the root (in the illustrated example, the "BOOK" element) from the individual leaf elements (the "PARA" elements) displayed in the document display area 112, and the common element initially hit from the individual leaf elements may be determined as the "minimum element".

Scrolling up and down in the electronic document changes the range of the electronic document which is displayed in the document display area 112. When the display range includes plural elements, it is difficult to determine which element the user (who has performed the scrolling operation) is focusing on. In the illustrated example, therefore, it is determined that a minimum element in the hierarchical structure which includes plural elements within the display range is the element that the user has referred to.

The entirety of an element located at the upper or lower end of the document display area 112 may not always be displayed. In the processing of S34 for specifying a reference source element, partially displayed elements, which are located at the upper and lower ends of the document display area 112, are ignored.

Figure 9:
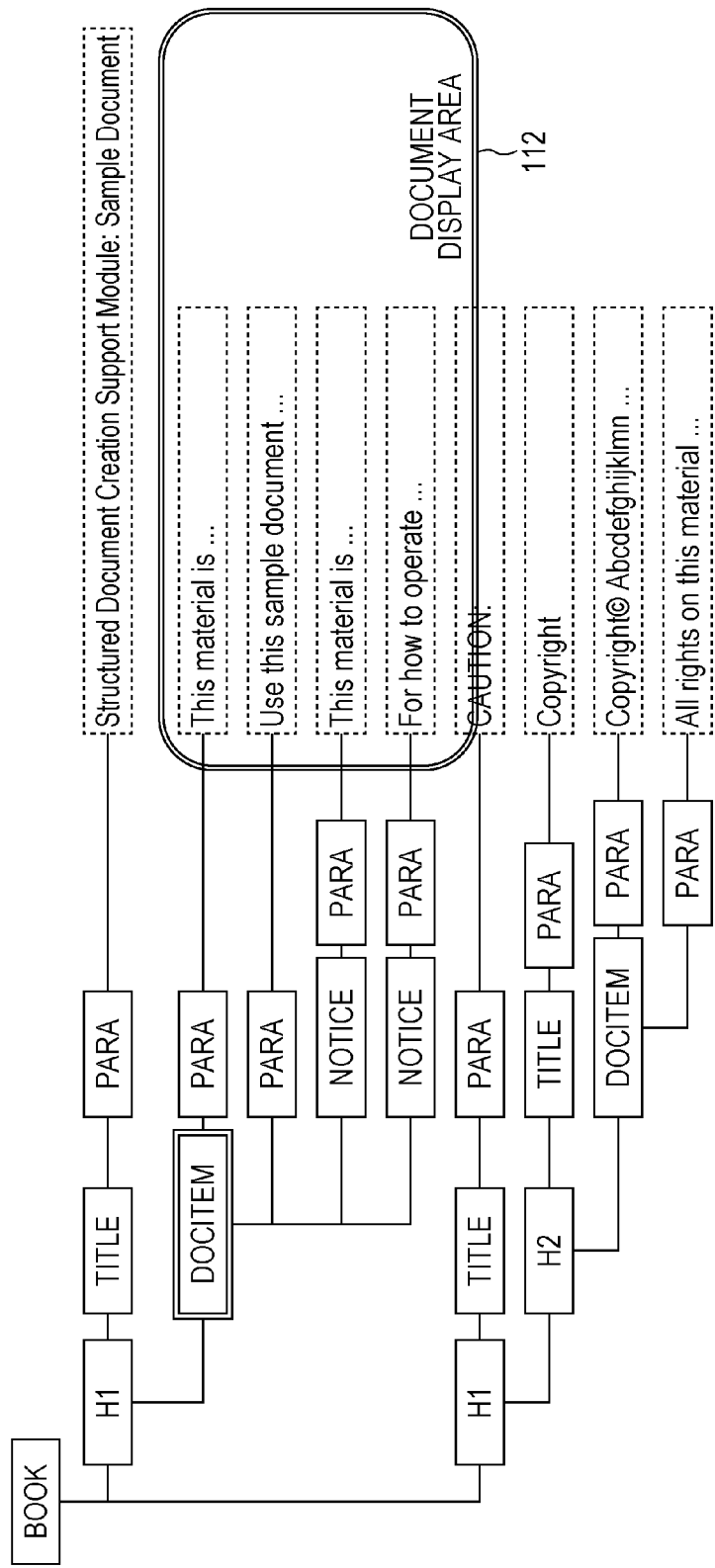
FIG. 9 illustrates a minimum element including elements displayed in the display window at another time point.

For example, in the example illustrated in FIG. 9, when the scroll stops, the entirety of the second to fifth "PARA" elements from the top of the tree structure of the elements of the electronic document are displayed in the document display area 112, whereas, part of the sixth "PARA" element is displayed in the document display area 112. In this case, the sixth "PARA" element, part of which is displayed, is ignored, and the minimum element "DOCITEM" (in FIG. 9, highlighted with a double line frame) including the second to fifth "PARA" elements is specified as the reference source element that the user refers to.

In another example, even an element the entirety of which is displayed may be ignored in the process of specifying the reference source element if the element is a "title" element. In general, a document includes chapter titles and section titles for individual chapters and sections, followed by the content of the respective chapters and sections. In general, the content of text may be more likely to be referred to while a title may be less likely to be referred to during the editing of a document. Thus, in an example, a title element in the document display area 112 may be ignored in the process of specifying the reference source element. For example, in the example illustrated in FIG. 9 described above, it is assumed that the entirety of the sixth "PARA" element ("CAUTION") is displayed in the document display area 112. In a case where all the types of elements are equally handled (that is, in a case where no elements are ignored), the element including all the second to sixth "PARA" elements is the root of the tree, namely, the "BOOK" element. In contrast, in a method in which only the elements representing the content of text are taken into account while title elements are ignored, the sixth "PARA" element ("CAUTION") from the top is ignored because the element superior to the sixth "PARA" element is a "TITLE" element representing a title. On the other hand, the second to fifth "PARA" elements are elements subordinate to the "DOCITEM" element representing the content of text. In this case, therefore, only the second to fifth "PARA" elements are taken into account, and the minimum element "DOCITEM" including the second to fifth "PARA" elements is determined to be the element that the user refers to. Note that which type of element to ignore and which type of element to take into account in the process of specifying the element of the reference source may be defined in advance. In the example described above, by way of example, elements subordinate to the "TITLE" elements are ignored and elements subordinate to the "DOCITEM" elements are taken into account.

Referring back to FIG. 7, if it is determined in S32 that the user operation is not a scrolling operation, it is determined whether or not the subsequent operation is an operation involving highlighting a character string (that is, it is determined whether or not any character string has been highlighted as a result of the operation) (S36). For example, when a character string is searched for, a character string that matches the search condition is found from the electronic document, and the electronic document is scrolled to display a portion including the character string in the document display area 112. The found character string being displayed is highlighted (or enhanced) in the document display area 112. Further, when the user selects (or specifies) a certain range (for example, a certain character string) in the document display area 112 by using a pointing device or the like, the range is highlighted. In S36, such a highlighted portion is detected. If a highlighted portion is detected, the operation analysis unit 16 identifies the minimum element including the highlighted portion as the element that the user refers to, and obtains the element ID of the identified element (S38).

Figure 10:
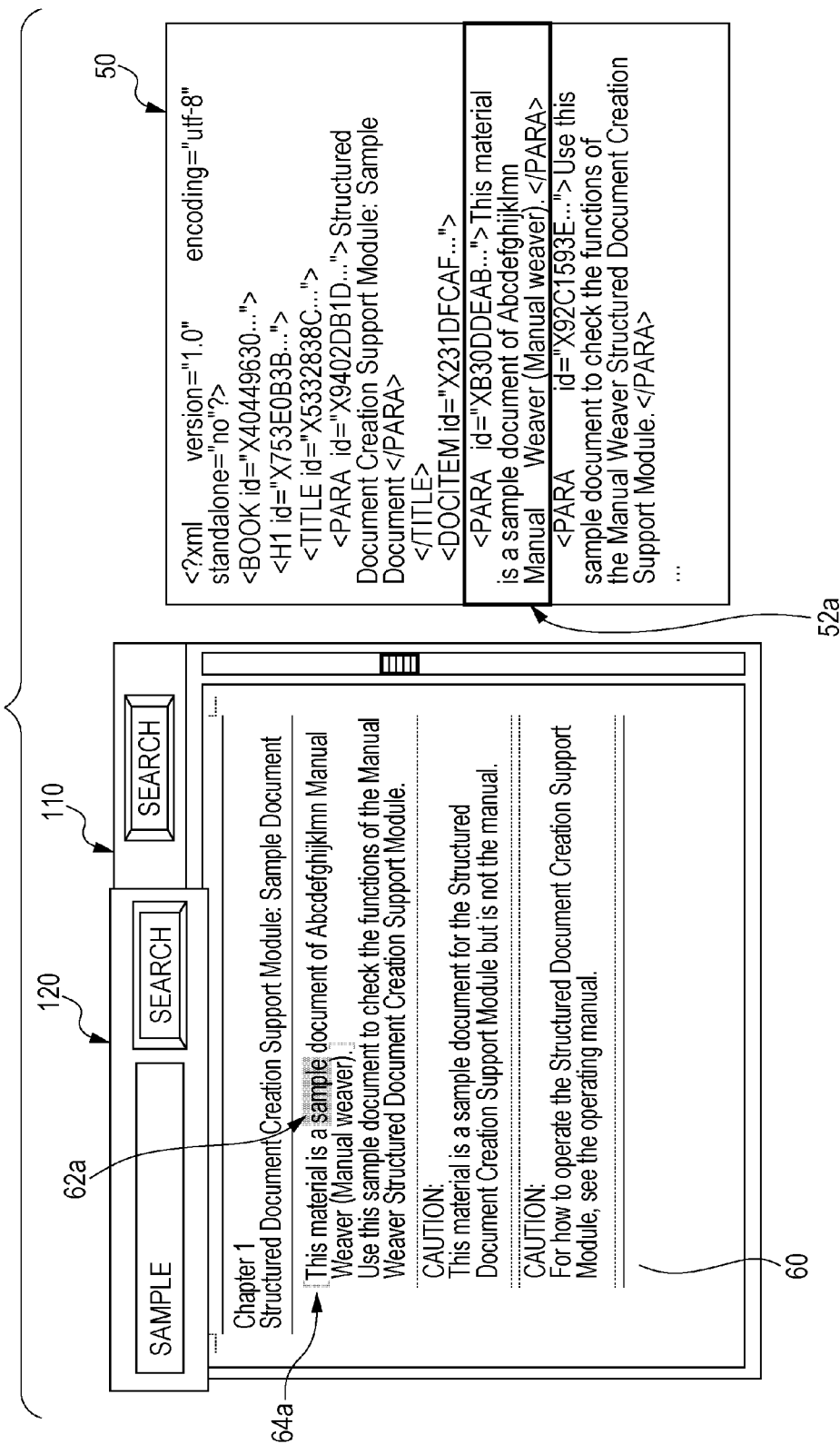
FIG. 10 illustrates an example of a highlighted portion obtained as a search result in a document in the display window and elements in an XML document including the highlighted portion.

For example, as illustrated by way of example in FIG. 10, when the character string "sample" is entered as a search condition in the search window 120 and a search is instructed, a portion including a character string 62a that matches the search condition in the electronic document is displayed as the displayed document 60 in the display window 110. The minimum element including the character string 62a is a "PARA" element 52a which is surrounded with a black frame in the electronic document 50, and represents a paragraph indicated by reference numeral 64a in the displayed document 60. The operation analysis unit 16 specifies the element 52a, and obtains the element ID (in example illustrated in FIG. 10, "XB30DDEAB . . . ") of the element 52a.

In some cases, a highlighted character string may include multiple "PARA" elements. In such cases, in S38, the minimum element including the multiple elements is specified, and the element ID of the minimum element is obtained.

Referring back to FIG. 7, if it is determined in S36 that the user operation is not an operation involving highlighting, the operation analysis unit 16 determines whether or not the operation is an operation of setting a cursor (S40). If the user operation is an operation of specifying the position of the cursor in the document display area 112 using a mouse or the like, Yes is obtained in S40. In this case, the operation analysis unit 16 specifies the minimum element including the set position of the cursor (in the example illustrated in FIGS. 2 and 4, any of the "PARA" elements including the content of text), and obtains the element ID of the specified element (S42).

If it is determined in S40 that the user operation is not an operation of setting a cursor, the operation analysis unit 16 determines whether or not the operation is a copying operation (S44). The copying operation is an operation for copying data of a range (such as a character string) selected using a mouse or the like (in general, data of a selected range is highlighted) to a temporary storage area such as a clipboard provided by the operating system or the like. If a copying operation is detected, the operation analysis unit 16 specifies the minimum element including the range of the target of the copying operation, and obtains the element ID of the element (S46).

Figure 11:
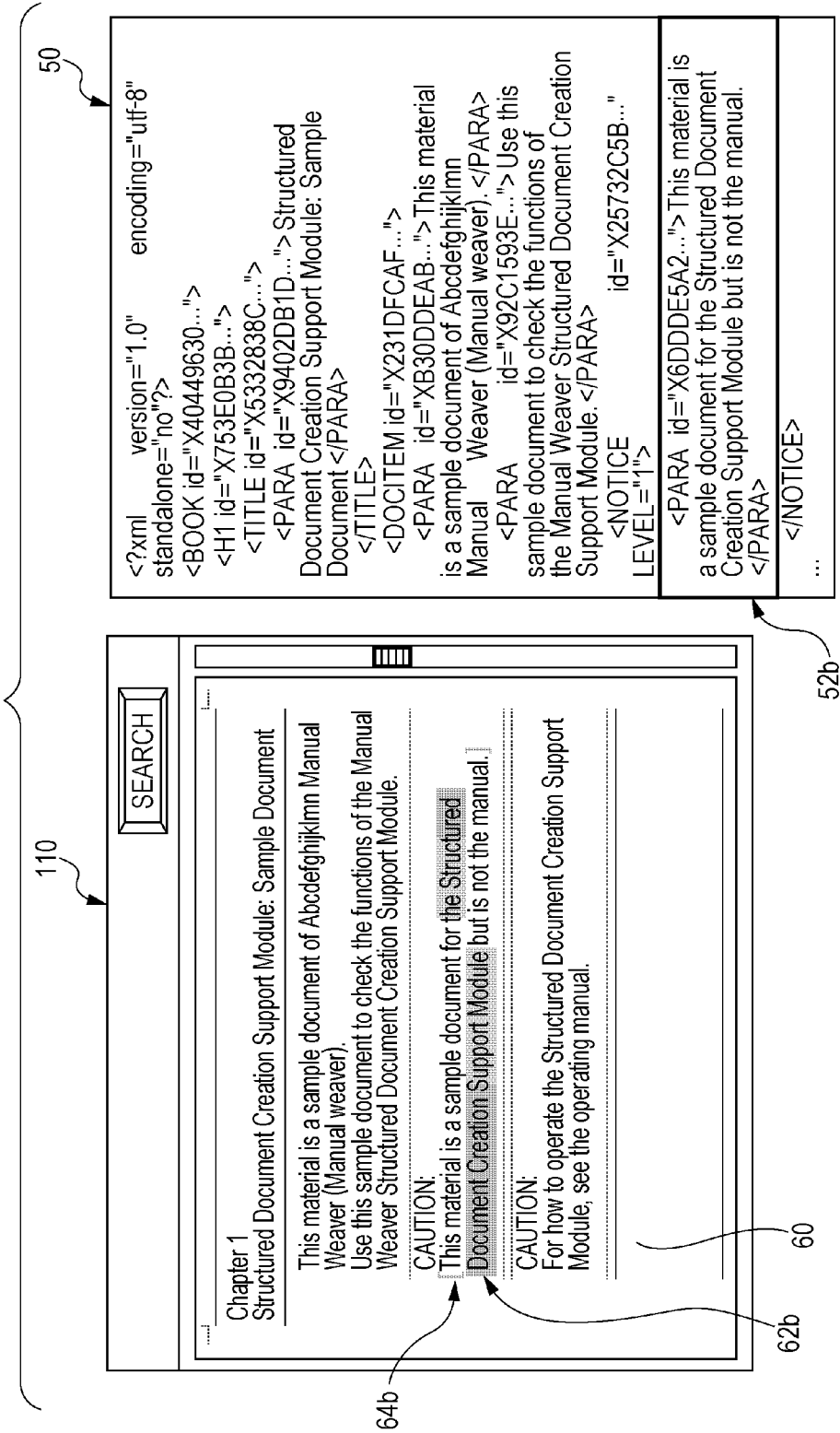
FIG. 11 illustrates an example of a highlighted portion for a copying operation in a document in the display window and elements in an XML document including the highlighted portion (to be copied)

For example, in an example illustrated in FIG. 11, the user has given an instruction to copy a character string 62b selected and highlighted in the displayed document 60 in the display window 110. In this case, the minimum element including the character string 62b is a "PARA" element 52b surrounded with a black frame in the electronic document 50, and represents a paragraph indicated by reference numeral 64b in the displayed document 60. The operation analysis unit 16 specifies the element 52b, and obtains the element ID (in the example illustrated in FIG. 11, "X6DDDEA5A2 . . . ") of the element 52b.

After the processing of S34, S38, S42, or S46, the operation analysis unit 16 determines relevance scores for the types of operations corresponding to the respective steps, passes the determined relevance scores to the association unit 18 in association with the element IDs of the elements that the user refers to (or the "reference source elements") obtained in the respective steps (if each of the element IDs does not include information identifying an electronic document including the element identified by the element ID, a pair of IDs including a document ID identifying the electronic document and the element ID) (S48). The relevance scores are determined from the information stored in the operation-based score memory 20. In S48, information indicating that the user operation relates to the reference operation is also passed to the association unit 18.

FIG. 12 illustrates an example of scores for operations relating to the reference operation among information on relevance scores for individual types of operations which is stored in the operation-based score memory 20. In the illustrated example, the relevance scores for the "Scroll", "Highlight", "Copy", and "Set cursor" operations are set to "1", "2", "4", and "2", respectively. In the illustrated example, the larger the value of the relevance score is, the stronger the association is. For example, when data "copied" on the electronic document at the reference source is "pasted" on the electronic document at the edit destination, the "copied" data is used for the edit destination, and there may be strong association between the reference source and the edit destination. Thus, in the illustrated example, a high score is set for the "Copy" operation. In contrast, scrolling and displaying are not sufficient to determine whether or not the user has referred to the displayed item when editing the edit destination. In addition, even if the user has referred to the displayed item, it may be difficult to determine which portion of the document in the document display area 112 the user has referred to. For this reason, a low score is assigned to the "Scroll" operation. The "Highlight" and "Set cursor" operations have a higher score than the "Scroll" operation because it may be determined which portion of the document in the document display area 112 the user has particularly focused on.

In the example illustrated in FIG. 12, for example, when a copying operation is performed, in S48, the operation analysis unit 16 passes the element ID of the element targeted by the identified operation to the association unit 18 in association with the relevance score "4" for the copying operation.

The information to be passed to the association unit 18 in S48 may include information (for example, an operation type ID indicating "Copy") indicating the detected type of operation, instead of the relevance score and information indicating a reference operation. With this information, it may be determined that the detected operation relates to the reference operation, and the relevance score for the detected operation may be determined later by referring to the operation-based score memory 20.

In the procedure illustrated in FIG. 7, if No is obtained in S44, the operation analysis unit 16 skips the processing of S48 and exits the procedure illustrated in FIG. 7. Then, the operation analysis unit 16 proceeds to S14 in the procedure illustrated in FIG. 6. In the example illustrated in FIG. 7, four operations, namely, "Scroll", "Highlight", "Copy", and "Set cursor", relate to the reference operation. For example, if there is a further operation relating to the reference operation, processing similar to that described above as an illustrative example for the respective operations such as "Scroll" is performed for the further operation.

The order of the four determination operations of S34, S38, S42, and S46 (and the accompanying processes for specifying elements targeted by the operations) in the procedure illustrated in FIG. 7 described above is merely an example, and the determination operations described above may be executed in any order.

Referring back to the procedure illustrated in FIG. 6, if it is determined that the user operation obtained in S30 in FIG. 7 does not match any of the operations relating to the reference operation in the processing illustrated in FIG. 7, the operation analysis unit 16 determines whether or not the obtained user operation is an editing operation (S14). Examples of operations relating to the editing operation may (but not limited to) include "Input text", "Add element", "Paste", and "Delete element". If it is determined in S14 that the operation obtained in S30 does not relate to the editing operation, the process returns to S12 (that is, the procedure illustrated in FIG. 7), and waits for the user to perform the subsequent operation. When a subsequent operation is performed, the processing of S30 in FIG. 7 and the subsequent processing are performed on the operation.

If it is determined in S14 that the operation obtained in S30 relates to the editing operation, the operation analysis unit 16 obtains the position of the target of the detected operation (that is, the position at which the current editing operation has started) from the display/editing processing unit 10 (S16). The term "position" of the target of the editing operation refers to the position of an element. In the case of "Input text", "Paste", and similar operations, the position of the target of editing is a position (or range) specified by the setting of a cursor or by an operation including highlighting, such as specifying a range. In S16, the element ID of the minimum element including the position (or range) is obtained as an edit start position. In the case of the "Add element" operation, the display/editing processing unit 10 assigns an element ID to an added element. Thus, in S16, the element ID assigned to the added element is obtained as an edit start position.

Then, the operation analysis unit 16 determines a relevance score for the type of editing operation determined in S14 from the operation-based score memory 20, and passes the relevance score to the association unit 18 in association with the element ID specified in S16 (or together with the document ID of an electronic document including the element identified by the element ID if the element ID does not include information identifying the electronic document) (S18).

FIG. 13 illustrates an example of scores for operations relating to the editing operation among information on relevance scores for individual types of operations which is stored in the operation-based score memory 20. In the illustrated example, the relevance scores for the "Input text", "Add element", "Paste", and "Delete element" operations are set to "1", "3", "2", and "0", respectively. Also in the illustrated example, the larger the value of the relevance score is, the stronger the association is. The "Add element" operation is an operation of adding a new element to a structured document, and has the highest relevance score on the basis that adding a new element is more effective than editing an existing element. The "Paste" operation has a high relevance score (in the illustrated example, however, the relevance score for the "Paste" operation is lower than that for the "Add element" operation) for a similar reason to that of the copying operation, which is a type of reference operation. The "Delete element" operation is an operation of removing an element to be associated with another element, and therefore an element targeted by this operation is not used for association. The non-target of association is represented by a relevance score of "0" in the example illustrated in FIG. 13. In this case, a relevance between elements is determined by multiplying a relevance score for the reference operation by a relevance score for the editing operation. If the relevance score for the editing operation is "0", a relevance between elements is "0", which indicates that there is "no association", regardless of the relevance score for the corresponding reference operation. Instead of the relevance score for the "Delete element" operation being set to "0", the "Delete element" operation may be excluded from the editing operation to be taken into account for association between elements.

In the example illustrated in FIG. 13, for example, when a paste operation is performed, in S18, the operation analysis unit 16 passes the element ID of the element targeted by the specified operation to the association unit 18 in association with the relevance score "2" for the paste operation. In S18, information indicating that the specified operation relates to the editing operation is also passed to the association unit 18.

The information to be passed to the association unit 18 in S18 may include information indicating the detected type of operation (for example, an operation type ID indicating "Paste"), instead of the relevance score and information indicating an editing operation. With this information, it may be determined that the detected operation relates to the editing operation, and the relevance score for the detected operation may be determined later by referring to the operation-based score memory 20.

Upon receiving information indicating that an editing operation has been performed (including the element ID of the target of the operation and the relevance score or information indicating the type of operation) from the operation analysis unit 16, the association unit 18 associates the element targeted by the editing operation with the element targeted by the reference operation immediately before the editing operation (S20). The association unit 18 has already received information on one or more reference operations (including element IDs of the targets of the operations and relevance scores or information indicating the types of operations) in sequence from the operation analysis unit 16 when the association unit 18 receives the information on the editing operation. In S20, the association unit 18 specifies the reference operation immediately before the editing operation, except the operation for specifying the position or range of the target of the editing operation, from among the sequentially received reference operations. The operation of specifying the position or range of the target of the operation which immediately precedes the editing operation in the same electronic document as the electronic document targeted by the editing operation is regarded as the operation for specifying the position or range of the target of the editing operation, and, except this operation, the reference operation immediately before the editing operation in order is specified. Then, the element ID of the element targeted by the editing operation and the element ID of the element targeted by the specified reference operation are registered as a pair of element IDs in the association DB 22. In addition, the relevance scores for the editing operation and the reference operation (or information indicating the types of operations (such as "Copy")) are also registered.

FIG. 14 illustrates an example of data stored in the association DB 22. In the illustrated example, an ID of an element (reference source element) targeted by a reference operation and a detailed type thereof (such as "Copy"), and an ID of an element (or edit destination element) targeted by the editing operation and a detailed type thereof (such as "Paste") are registered in association with each other. Instead of or in addition to a detailed type of operation, a relevance score for the type of operation may be registered (in FIG. 14, relevance scores are in parentheses). In the example illustrated in FIG. 14, in the reference source element IDs and the edit destination element ID, the most significant digits "X" and "Y" represent information identifying electronic documents at the reference source and the edit destination, respectively, and three digits after the most significant digits "X" and "Y" represent information identifying individual elements in the electronic documents.

After the completion of association in the manner described above, the operation analysis unit 16 waits for the current editing operation to be completed (for example, for the input of plural characters to be completed) (S22). When the editing operation is completed, the process returns to S12, and the process waits for a new operation to be performed. Specifically, editing operations after the start of an editing operation is detected in S14 are regarded as an integrated editing operation so long as the editing operations are consecutive (for example, during the continuation of a text input operation). When the series of editing operations is completed (for example, when a different operation such as a reference operation is performed), the process returns to S12.

Figure 15:
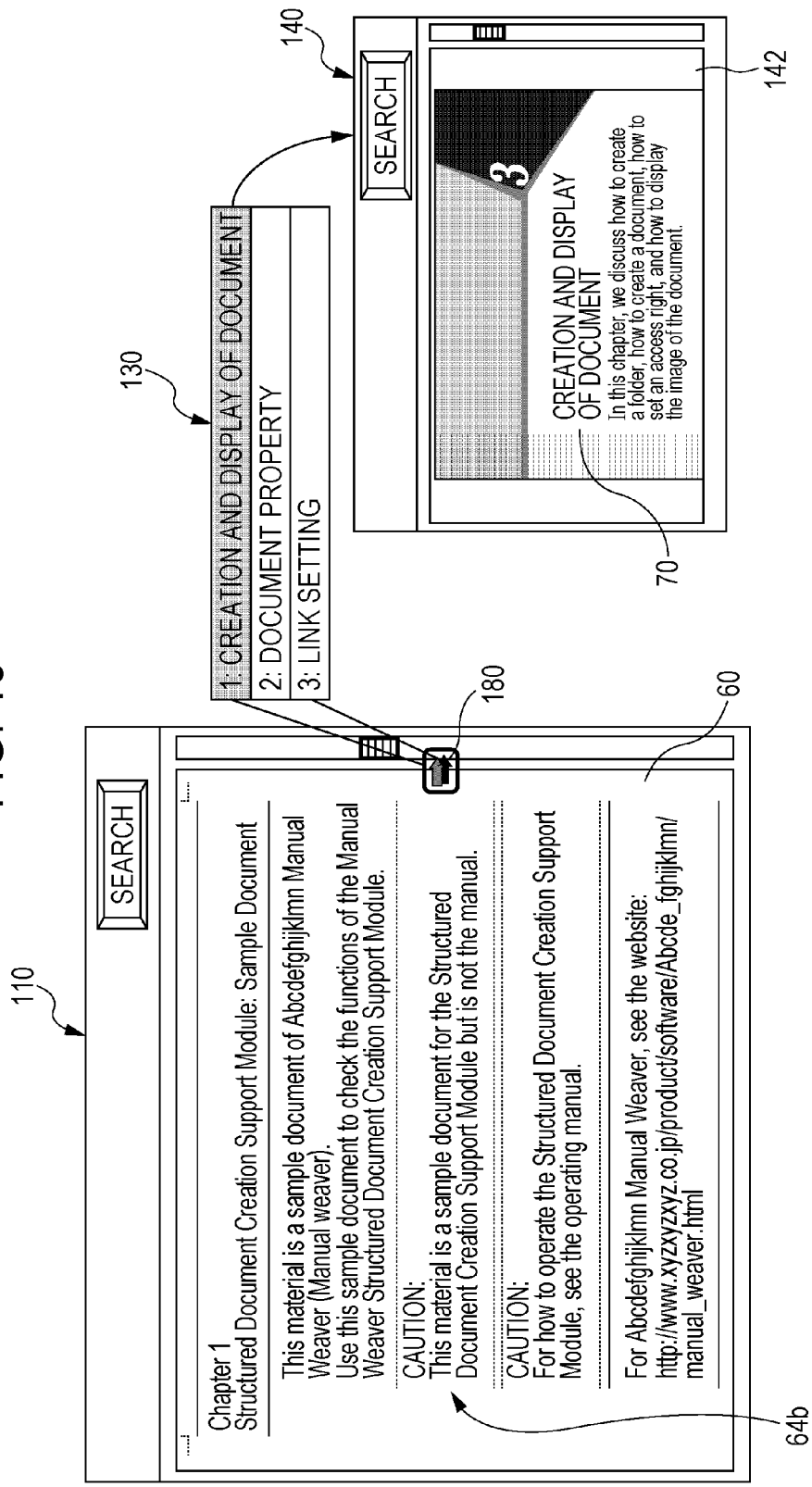
FIG. 15 illustrates an example of a presented element associated with an element in the display window.

Next, an example of a process of the association information presentation processing unit 24 will be described with reference to FIG. 15.

The association information presentation processing unit 24 refers to the association DB 22 to determine whether or not the displayed document 60 displayed in the document display area 112 of the display window 110 by the display/editing processing unit 10 includes an element having an edit destination element ID that matches an edit destination element ID recorded on the association DB 22. In the example illustrated in FIG. 15, it is assumed that an element 64b has been registered as an edit destination element in the association DB 22. If such an edit destination element exists, a reference source element ID recorded in association with the edit destination element ID corresponding to the edit destination element is determined from the association DB 22, and the element in the electronic document which is identified by the reference source element ID is read from the document DB 12 so that the content of the identified element is displayed on the screen. The content of the element may be displayed, for example, in pop-up for reference only, or may be displayed using the display window 110 where an editing operation generated by the display/editing processing unit 10 is acceptable. In addition, the displayed content may be scrollable so as to make the elements before and after the reference destination element viewable.

Furthermore, instead of the content of the associated reference source element being directly displayed in the manner described above, as in the example illustrated in FIG. 15, a GUI button 180 linked to the associated reference destination element may be displayed near the edit destination element 64b in the display window 110 to allow the user to view the content of the reference destination element when the user presses the GUI button 180.

Further, multiple reference source elements associated with a certain edit destination element in a displayed document displayed in the display window 110 may be found from the association DB 22. In this case, the association information presentation processing unit 24 calculates, using the relevance calculation unit 26, individual relevances of the reference source elements with the edit destination element. Specifically, the association information presentation processing unit 24 reads the relevance scores of the individual reference source elements and the edit destination element from the association DB 22 (see FIG. 14), and calculates, for each of the reference source elements, an association value between the reference source element and the edit destination element by using the combination of the relevance scores of the reference source element and the edit destination element. The association value between each of the reference source elements and the edit destination element may be calculated by substituting the score of the reference source element and the score of the edit destination element into a predetermined function, such as by multiplying the relevance score of the reference source element and the relevance score of the edit destination element. Inputting the two scores instead of inputting a function may make it possible to perform calculation using various other methods such as using a lookup table of hardware that outputs a relevance corresponding to the pair of elements.

In a method, the association DB 22 may have registered therein, instead of relevance scores, detailed types of operations corresponding to reference source elements and edit destination elements which are associated with each other (such as "Scroll" and "Input text"). In this method, the relevance calculation unit 26 may refer to the operation-based score memory 20 to determine relevance scores for the individual types of operations, and calculate a relevance from the determined scores.

Further, instead of the association information presentation processing unit 24 (namely, the relevance calculation unit 26) calculating a relevance, the association unit 18 may calculate a relevance between an edit destination element and a reference source element and register the relevance in the association DB 22. Then, the association information presentation processing unit 24 may read the relevance from the association DB 22.

When relevances of individual reference source elements associated with an edit destination element included in the displayed document 60 displayed in the display window 110 are determined in the manner described above, the association information presentation processing unit 24 creates a menu 130 (see FIG. 15) in which the reference source elements are arranged in order from the highest relevance. In the menu 130, for each reference source element, a text with a predetermined number of characters from the beginning of the reference source element is displayed to help the user identify the reference source element. This is merely an example, and, instead of this example, information indicating the content of individual reference source elements, such as thumbnail images of the reference source elements, may be displayed in the menu 130. The menu 130 is associated with the GUI button 180 displayed near the edit destination element 64*b* included in the displayed document 60 displayed in the display window 110.

The user presses the GUI button 180 by performing a mouse operation or the like to refer to the information associated with the edit destination element 64*b*. Then, the menu 130 is displayed on the screen by the association information presentation processing unit 24. The user selects one of the elements arranged in order of relevances in the menu 130 to which the user wishes to refer, by performing a mouse operation or the like. In the example illustrated in FIG. 15, in response to the user operation, the association information presentation processing unit 24 creates a reference information display window 140 in which content 70 of a range centered at the selected element within an electronic document including the selected element is displayed in a document display area 142, and displays the reference information display window 140 on the screen.

As described above, in the system according to this exemplary embodiment, a user may merely perform a normal operation for reference or editing without performing any special operation for associating elements with each other, thereby allowing the operation analysis unit 16 and the association unit 18 to detect association between the elements and register the association in the association DB 22. An element associated with a certain element in the display window 110 is presented to the user in accordance with association between elements registered in the association DB 22.

The foregoing description provides an example of associating an element to be referred to in a first electronic document with an element to be edited in a second electronic document different from the first electronic document, when editing the second electronic document while referring to the first electronic document. This exemplary embodiment is not limited to the example described above. As may be understood from the details of the processes according to this exemplary embodiment described above, a technique according to this exemplary embodiment may be applicable to, while referring to a first range (including one or more elements) in a certain electronic document, the editing of a second range different from the first range in the same electronic document (including elements at least some of which are different from the elements in the first range).

In the foregoing example, a relevance between an edit destination element and a reference source element is calculated from the relevance scores of these elements; however, this is merely an example. Instead of this, for example, the relevance score of one of an edit destination element and a reference source element may be used as a relevance between the edit destination element and the reference source element.

In another example, the frequency with which each element is referred to may be reflected in the relevance of the element. As illustrated by way of example in FIG. 16, for example, in the association DB 22, the frequency with which each element has been referred to (hereinafter referred to as the "reference frequency") is managed in association with the element ID of the element, and each time an association between a reference source element and an edit destination element is registered, the reference frequency of the reference source element is increased by 1. When calculating a relevance between an edit destination element and a reference source element associated therewith which are displayed in the display window 110, the relevance calculation unit 26 determines a reference frequency associated with the element ID of the reference source element, and calculates a relevance in accordance with a rule or function in which the higher the reference frequency is, the higher the relevance is. For example, a value obtained by multiplying a relevance score of a reference source element by a relevance score of an edit destination element may be multiplied by the reference frequency of the reference source element, and the resulting value may be used as the relevance between the reference source element and the edit destination element.

In some cases, the system according to this exemplary embodiment may be used by multiple persons. For example, multiple persons may cooperate to edit one electronic document. In such cases, information on association between elements (see FIG. 14) is registered in the association DB 22 in accordance with the reference operations and the editing operations of the individual persons. Here, as illustrated by way of example in FIG. 17, information (hereinafter referred to as "association information") on association between elements to be registered in the association DB 22 may include user IDs (in FIG. 17, represented as "operator ID") of users who have performed the reference operations and the editing operations through which the association information has been obtained. The user IDs may be obtained during, for example, user authentication at the login of the individual users to the system. The user who opens the display window 110 may specify which user operation to take into account within pieces of association information in the association DB 22 to present an element associated with an element in the display window 110. For example, if the user specifies that only association information based on an operation made by the user is taken into account, only pieces of information for which the "operator ID" is the ID of the user are extracted from among the pieces of association information in the association DB 22. Then, a piece of association information in which an element in the display window 110 is included as an edit destination element is searched for among the extracted pieces of association information, and a reference source element included in found association information is displayed as related information on the screen. Similarly, if a specific user or multiple users are specified as persons to which information is to be presented, pieces of association information obtained through the operation or operations made by the specified one or more users are extracted from the association DB 22, and an element associated with each element within the extracted pieces of information is presented in the display window 110.

In the foregoing example, when an element in the display window 110 is registered as an "edit destination" element in the association DB 22, the content of a "reference source" element associated with the element registered as the "edit destination" element is presented. That is, one-way association from the edit destination to the reference source is presented. However, this is merely an example, and, instead of this example, two-way association may be presented.

When two-way association is to be presented, if an element in the display window 110 is an "edit destination" in the association DB 22, the associated "reference source" is presented, and, if an element in the display window 110 is a "reference source" in the association DB 22, the associated "edit destination" is presented. In the presentation of two-way association, information indicating which of the reference source and the edit destination the element to be presented is may also be presented.

Furthermore, the user may specify whether an electronic document to be opened by using the display/editing processing unit 10 is to be edited or is used for reference. In this configuration, editing operations are disabled for an electronic document used for reference while only reference operations are acceptable, and the operation analysis unit 16 detects such reference operations. Further, for an electronic document to be edited, the operation analysis unit 16 detects only an editing operation performed on the document but ignores any reference operations performed on the document. If an editing operation is performed on an electronic document to be edited immediately after a reference operation is performed on an electronic document used for reference (the reference operation performed on the electronic document to be edited, which has been performed before the editing operation, is ignored), the association unit 18 registers the element targeted by the reference operation and the element targeted by the editing operation in the association DB 22 in association with each other.

In the foregoing example, furthermore, in a case where an electronic document includes multiple elements which are targeted by an operation such as a scrolling operation, the "minimum element" including the multiple elements in the hierarchical structure of the electronic document is set as an element to be associated with another element. However, this is merely an example. Instead of this example, the multiple elements may be grouped into a single set, and the single set may be associated with an element targeted by the corresponding operation. In this case, when relevant elements are to be presented, a window in which the multiple elements included in the set are displayed may be displayed on the screen. Alternatively, a representative element (for example, an element located at the beginning of the displayed document 60 among the multiple elements) may be selected in accordance with a predetermined rule among the multiple elements, and the representative element may be associated with an element targeted by the corresponding operation.

In the method in which the "minimum element" including multiple elements targeted by an operation is to be associated with another element, a superior element including the multiple elements, such as a section or chapter, may be a "minimum element". Thus, relevant elements are presented, starting from the beginning of such a section or chapter. If a user is required to go back to the beginning of a section or chapter to understand the content of the individual elements, with the use of a "minimum element" as a target of association, the beginning of the section or chapter may be presented as a "clue" or the like when relevant elements are presented. This may reduce the operation load on the user.

The document editing system described above as an illustrative example may be implemented by, for example, causing a general-purpose computer to execute a program representing processing of each of the function modules described above. The computer may have a circuit configuration in which, for example, as hardware, a microprocessor such as a central processing unit (CPU), memory devices (primary memory) such as a random access memory (RAM) and a read-only memory (ROM), a hard disk drive (HDD) controller that controls an HDD, various input/output (I/O) interfaces, a network interface that controls connection with a network such as a local area network, and so forth are connected to one another via, for example, a bus. Further, a disk drive for reading from and/or writing to a portable disk recording medium such as a compact disc (CD) or a digital versatile disc (DVD), a memory reader/writer or the like for reading from and/or writing to portable non-volatile recording media according to various standards, such as a flash memory, or any suitable device may be connected to the bus via, for example, an I/O interface. A program describing the content of the processing of each of the function modules described above as an illustrative example is stored in a fixed storage device such as a hard disk drive and installed into a computer via a recording medium such as a CD or a DVD or via a communication medium such as a network. The program stored in the fixed storage device is loaded onto the RAM and executed by the microprocessor such as a CPU to implement the function modules described above as an illustrative example. Further, the components constituting the document editing system described above as illustrative examples may be distributed into plural computers capable of communicating with each other via a network, and the distributed components may communicate with each other via a network to implement the functions of the document editing system described above.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document association device comprising:
a document memory that stores one or more electronic documents each including a plurality of elements;
a display unit that displays on a screen a first group of elements included in a first electronic document stored in the document memory, and a second group of elements included in a second electronic document stored in the document memory;
an operation receiving unit that receives a reference operation which is targeted at one or more elements in the first group of elements, and that receives an editing operation which is targeted at one or more elements in the second group of elements;
an association unit that, when the operation receiving unit receives an editing operation after a reference operation that corresponds to the editing operation has been received, associates the one or more elements targeted by the reference operation with the one or more elements targeted by the editing operation, and stores association information indicating the association of the elements;
a reference score memory that stores a relevance score for each type of reference operation;
a relevance calculation unit that calculates a relevance between associated elements that are associated with each other by the association unit, based on a relevance score for the type of the reference operation corresponding to the associated elements; and
a reference frequency recording unit that records, for each element, a reference frequency of the element indicating the number of times the element has been associated as an element targeted by the reference operation,
wherein the relevance calculation unit calculates the relevance between the associated elements based on the reference frequencies of the elements.

2. The document association device according to claim 1, wherein the first electronic document is different than the second electronic document.

3. The document association device according to claim 1, wherein the first electronic document and the second electronic document are different portions of the same document.

4. The document association device according to claim 1, further comprising:
an association information presentation unit that displays on the screen, in association with display of an element of the second electronic document, information on an element of the first electronic document that is associated with the element of the second electronic document, based on the stored association information.

5. A non-transitory computer readable medium storing a program causing a computer to execute a process, the process comprising:
storing one or more electronic documents, each including a plurality of elements, in a document memory;
displaying on a screen a first group of elements included in a first electronic document stored in the document memory, and a second group of elements included in a second electronic document stored in the document memory;
receiving a reference operation which is targeted at one or more elements in the first group of elements, and an editing operation which is targeted at one or more elements in the second group of elements;
upon receiving an editing operation after a reference operation that corresponds to the editing operation has been received, associating the one or more elements targeted by the reference operation with the one or more elements targeted by the editing operation, and storing association information indicating the association of the elements;
storing a relevance score for each type of reference operation;
recording, for each element, a reference frequency of the element indicating the number of times the element has been associated as an element targeted by the reference operation;
calculating a relevance between associated elements that are associated with each other, based on a relevance score for the type of the reference operation corresponding to the associated elements and the reference frequencies of the elements.

6. The computer readable medium according to claim 5, wherein the first electronic document is different than the second electronic document.

7. The computer readable medium according to claim 5, wherein the first electronic document and the second electronic document are different portions of the same document.

8. The computer readable medium according to claim 5, further comprising:
an association information presentation unit that displays on the screen, in association with display of an element of the second electronic document, information on an element of the first electronic document that is associated with the element of the second electronic document, based on the stored association information.

9. A document association method comprising:
storing one or more electronic documents, each including a plurality of elements, in a document memory;
displaying on a screen a first group of elements included in a first electronic document stored in the document memory, and a second group of elements included in a second electronic document stored in the document memory;
receiving a reference operation which is targeted at one or more elements in the first group of elements, and an editing operation which is targeted at one or more elements in the second group of elements;
upon receiving an editing operation after a reference operation that corresponds to the editing operation has been received, associating the one or more elements targeted by the reference operation with the one or more elements targeted by the editing operation, and storing association information indicating the association of the elements;
storing a relevance score for each type of reference operation;
recording, for each element, a reference frequency of the element indicating the number of times the element has been associated as an element targeted by the reference operation;
calculating a relevance between associated elements that are associated with each other, based on a relevance score for the type of the reference operation corresponding to the associated elements and the reference frequencies of the elements.

10. The document association method according to claim 9, wherein the first electronic document is different than the second electronic document.

11. The document association method according to claim 9, wherein the first electronic document and the second electronic document are different portions of the same document.

12. The document association method according to claim 9, further comprising:
an association information presentation unit that displays on the screen, in association with display of an element of the second electronic document, information on an element of the first electronic document that is associated with the element of the second electronic document, based on the stored association information.

\* \* \* \* \*